US012701458B2

(12) United States Patent
Barton et al.

(10) Patent No.: US 12,701,458 B2
(45) Date of Patent: Aug. 4, 2026

(54) USING MACHINE LEARNING TECHNIQUES TO PREDICT DEVICE BUFFER STATUS

(71) Applicant: Cisco Technology, Inc., San Jose, CA (US)

(72) Inventors: Robert Barton, Richmond (CA); Matthew Silverman, Shaker Heights, OH (US); Jerome Henry, Pittsboro, NC (US); Indermeet Gandhi, San Jose, CA (US); Malcolm Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 18/465,380

(22) Filed: Sep. 12, 2023

(65) Prior Publication Data

US 2024/0381166 A1 Nov. 14, 2024

Related U.S. Application Data

(60) Provisional application No. 63/501,436, filed on May 11, 2023.

(51) Int. Cl.
*H04W 28/02* (2009.01)
(52) U.S. Cl.
CPC ................................ *H04W 28/0278* (2013.01)
(58) Field of Classification Search
None
See application file for complete search history.

(56) References Cited

U.S. PATENT DOCUMENTS

2012/0176984 A1 7/2012 Susitaival et al.
2022/0038945 A1 2/2022 Dalmiya et al.

2022/0150954 A1 5/2022 Hussain et al.
2022/0240311 A1* 7/2022 Kim .................... H04W 56/001
2026/0019866 A1* 1/2026 Teyeb .............. H04W 28/0278

FOREIGN PATENT DOCUMENTS

WO 2021255107 A1 12/2023

OTHER PUBLICATIONS

Zhang, Q., et al. "Predicting Buffer Status Report (BSR) for 6G Scheduling Using Machine Learning Models," IEEE, May 16, 2022.

* cited by examiner

*Primary Examiner* — Tonia L Dollinger
*Assistant Examiner* — Ishrat Rashid
(74) *Attorney, Agent, or Firm* — Rutan & Tucker, LLP; Ravi Mohan; Marc McClain

(57) ABSTRACT

Devices, systems, methods, and processes are described herein that can reduce network communication overhead by reducing data that is sent. This reduction in data can be achieved by reducing the requests for data related to the buffers of one or more network devices. This buffer status data reduction can be achieved by predicting the current status of the buffers in other network devices. When the buffer predictions are sufficient, the need to request or poll for buffer status reports can be reduced. The buffer predictions can be evaluated through one or more confidence levels. These buffer predictions and confidence levels can be generated by one or more machine learning processes that are configured to operate on one or more network devices. Based on the confidence levels of the predictions, the number of buffer status report polls and of any unsolicited buffer service reports can be reduced.

10 Claims, 8 Drawing Sheets

Figure 3:
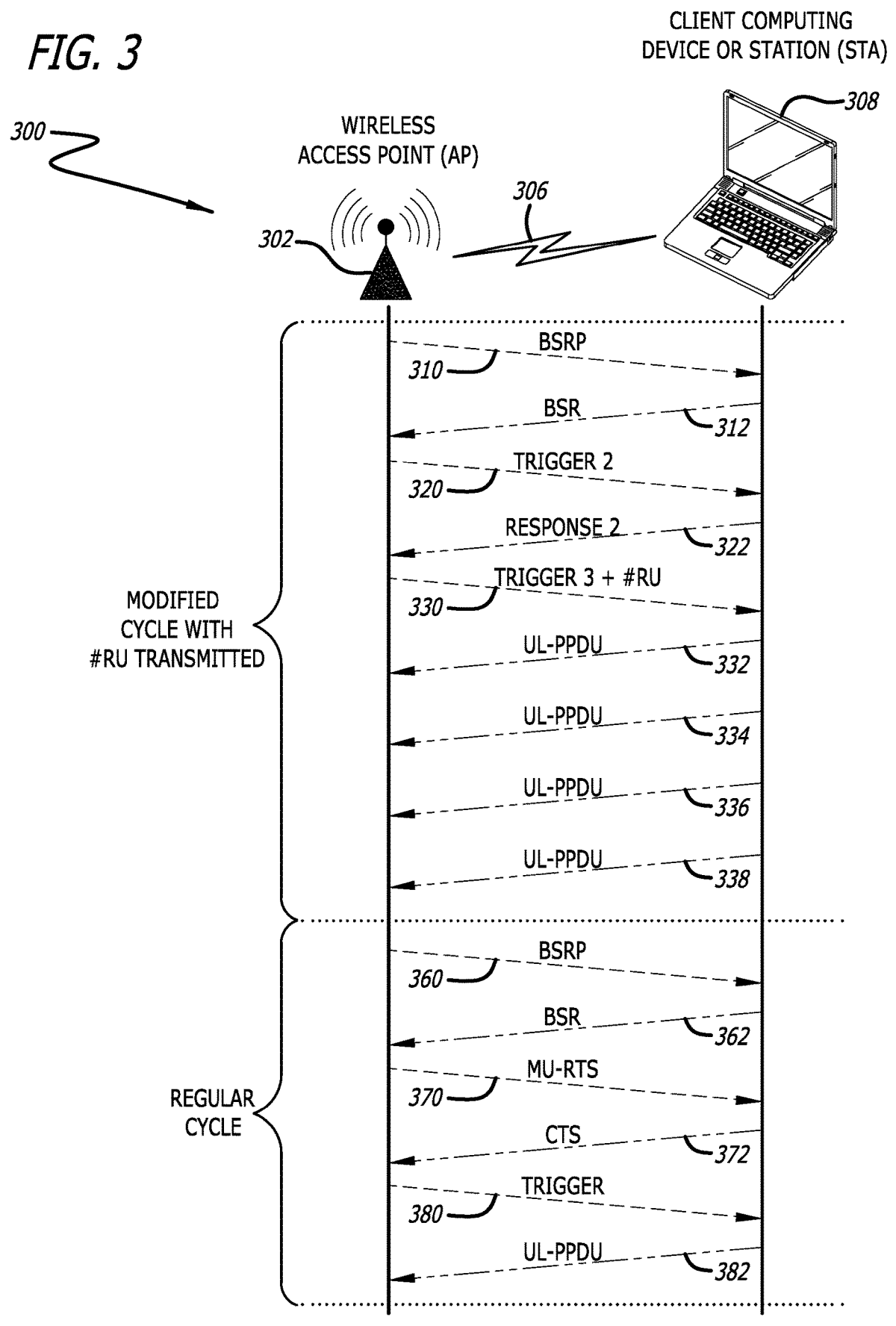

CLIENT COMPUTING
DEVICE OR STATION (STA)

308

WIRELESS
ACCESS POINT (AP)

306

302

MODIFIED
CYCLE WITH
RU TRANSMITTED

310    BSRP

BSR    312

320    TRIGGER 2

RESPONSE 2    322

330    TRIGGER 3 + #RU

UL-PPDU    332

UL-PPDU    334

UL-PPDU    336

UL-PPDU    338

REGULAR
CYCLE

360    BSRP

BSR    362

370    MU-RTS

CTS    372

380    TRIGGER

UL-PPDU    382

400

COUPLE TO A PLURALITY OF NETWORK DEVICES
WITH ONE OR MORE BUFFERS
—410

ISSUE A PLURALITY OF BUFFER SERVICE REPORT
(BSR) POLLS AT A FIRST POLLING RATE
—420

RECEIVE AT LEAST ONE BSR
—430

GENERATE A CONFIDENCE LEVEL ASSOCIATED
WITH THE ONE OR MORE BUFFERS
—440

UPDATE THE FIRST POLLING RATE BASED ON
THE CONFIDENCE LEVEL
—450

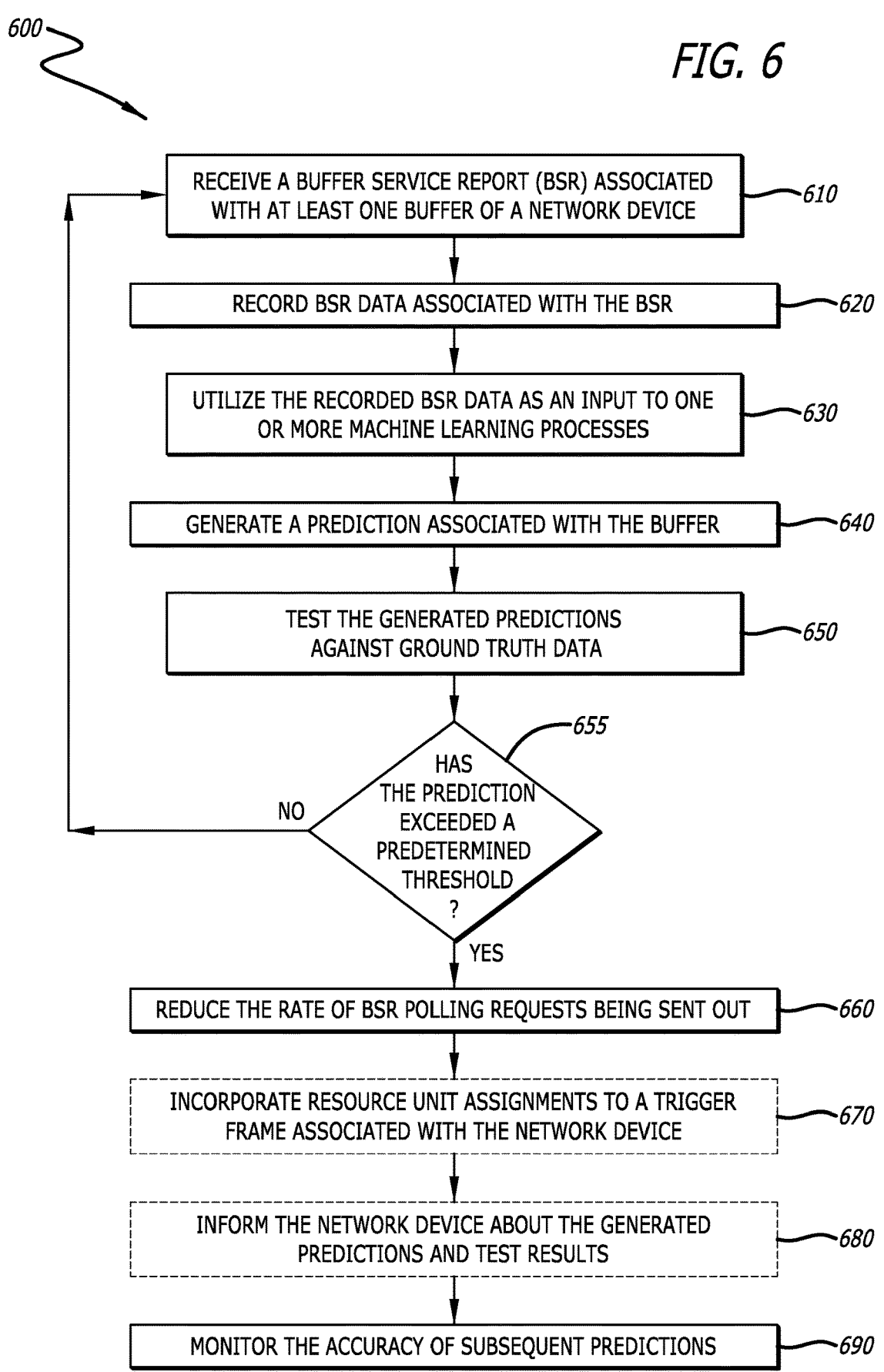

RECEIVE A BUFFER SERVICE REPORT (BSR) ASSOCIATED WITH AT LEAST ONE BUFFER OF A NETWORK DEVICE ~610

RECORD BSR DATA ASSOCIATED WITH THE BSR ~620

UTILIZE THE RECORDED BSR DATA AS AN INPUT TO ONE OR MORE MACHINE LEARNING PROCESSES ~630

GENERATE A PREDICTION ASSOCIATED WITH THE BUFFER ~640

TEST THE GENERATED PREDICTIONS AGAINST GROUND TRUTH DATA ~650

~655

HAS THE PREDICTION EXCEEDED A PREDETERMINED THRESHOLD ?

NO

YES

REDUCE THE RATE OF BSR POLLING REQUESTS BEING SENT OUT ~660

INCORPORATE RESOURCE UNIT ASSIGNMENTS TO A TRIGGER FRAME ASSOCIATED WITH THE NETWORK DEVICE ~670

INFORM THE NETWORK DEVICE ABOUT THE GENERATED PREDICTIONS AND TEST RESULTS ~680

MONITOR THE ACCURACY OF SUBSEQUENT PREDICTIONS ~690

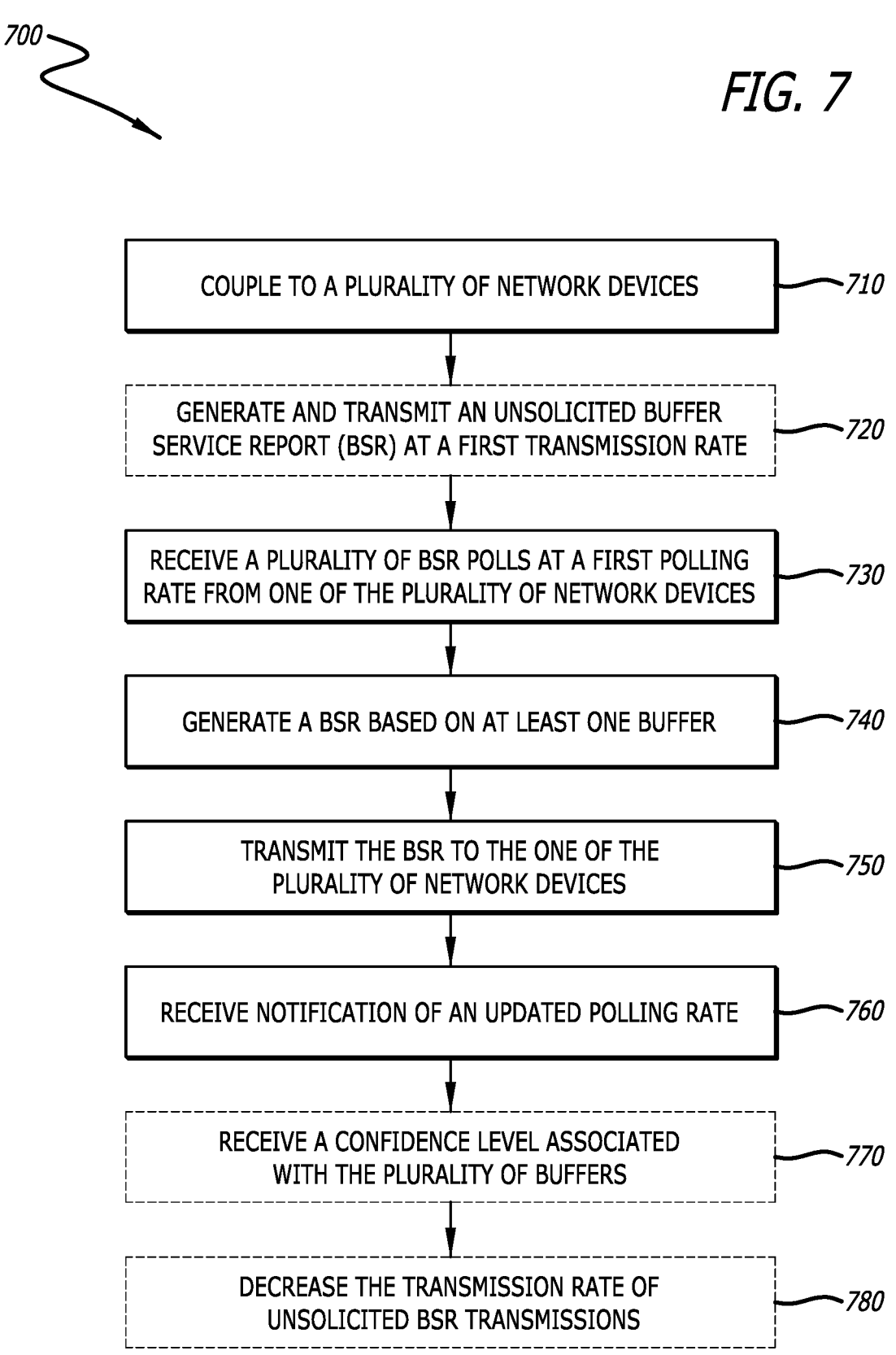

COUPLE TO A PLURALITY OF NETWORK DEVICES —710

GENERATE AND TRANSMIT AN UNSOLICITED BUFFER SERVICE REPORT (BSR) AT A FIRST TRANSMISSION RATE —720

RECEIVE A PLURALITY OF BSR POLLS AT A FIRST POLLING RATE FROM ONE OF THE PLURALITY OF NETWORK DEVICES —730

GENERATE A BSR BASED ON AT LEAST ONE BUFFER —740

TRANSMIT THE BSR TO THE ONE OF THE PLURALITY OF NETWORK DEVICES —750

RECEIVE NOTIFICATION OF AN UPDATED POLLING RATE —760

RECEIVE A CONFIDENCE LEVEL ASSOCIATED WITH THE PLURALITY OF BUFFERS —770

DECREASE THE TRANSMISSION RATE OF UNSOLICITED BSR TRANSMISSIONS —780

USING MACHINE LEARNING TECHNIQUES TO PREDICT DEVICE BUFFER STATUS

PRIORITY

This application claims the benefit of and priority to U.S. Provisional Application No. 63/501,436, filed May 11, 2023, which is incorporated in its entirety herein.

The present disclosure relates to wireless networking. More particularly, the present disclosure relates to using machine learning techniques for an access point to predict a buffer status of a scheduled station.

BACKGROUND

OFDMA (Orthogonal Frequency Division Multiple Access) generally refers to a multi-user version of OFDM (Orthogonal Frequency Division Multiplexing) technology that is used in many wireless communication systems such as Wi-Fi and LTE. While OFDMA offers many advantages, there are also some problems associated with this technology.

Beginning with 802.11ax (Wi-Fi6), OFDMA has become a standard mechanism for devices to access the 802.11 medium. OFDMA relies on a scheduled and structured method where the access points (APs) coordinates access to the medium for all stations (STAs). In OFDMA, the available frequency band is divided into many narrow subcarriers, each with its own frequency and phase. The subcarriers are orthogonal to each other, so they do not interfere with each other even when they are very close in frequency.

In the context of the 802.11ax and 802.11be standards, for example, overhead arises during each successive communication cycle due to the utilization of Trigger frames and responses. These standards aim to enhance network efficiency by using techniques like Basic Service Set (BSS) Coloring and OFDMA for more simultaneous data transmission.

However, this increased efficiency comes at the cost of added control signaling. The AP (Access Point) initiates communication by sending Trigger frames to multiple STAs (Station devices), prompting them to respond. The need for these Trigger frames and subsequent responses introduces overhead as it requires extra time and resources for coordination and negotiation between devices. While this overhead optimizes overall network performance, it can result in more signaling traffic and potentially reduced data throughput, particularly in scenarios with a large number of devices contending for airtime.

SUMMARY OF THE DISCLOSURE

In response to the problems described above, devices and methods are discussed herein that using machine learning techniques for an access point to predict a buffer status of a scheduled station. In some embodiments, a device, includes a processor, at least one network interface controller configured to provide access to a plurality of devices over a network, and a memory communicatively coupled to the processor, wherein the memory includes a buffer prediction logic. The logic is configured to couple to a plurality of network devices, wherein each of the plurality of network devices includes at least one buffer, issuing a plurality of buffer service report (BSR) polls at a first polling rate, receiving at least one BSR, wherein the BSR includes BSR data, utilize one or more machine learning processes to generate a confidence level associated with the buffer of at least one of the plurality of network devices, update the first polling rate to a second polling rate based on the generated confidence level.

In some embodiments, the BSR polls are issued directly to the plurality of network devices.

In some embodiments, the one or more machine learning processes utilize BSR data to generate the confidence level.

In some embodiments, the BSR data is associated with a period of time.

In some embodiments, the one or more machine learning processes generates a prediction of the current buffer status.

In some embodiments, the buffer prediction logic is further configured to receive ground truth data.

In some embodiments, the ground truth data is incorporated into the BSR.

In some embodiments, the one or more machine learning processes are further configured to generate an updated confidence level based on at least a comparison between the ground truth data to a previously generated prediction.

In some embodiments, the updated confidence level is transmitted to at least one of the plurality of network devices.

In some embodiments, the buffer prediction logic is further configured to monitor the updated confidence level over a period of time.

In some embodiments, in response to the updated confidence level falling below a predetermined threshold, the buffer prediction logic is further configured to increase the BSR polling rate.

In some embodiments, a device includes a processor, at least one network interface controller configured to provide access to a plurality of devices over a network, and a memory communicatively coupled to the processor, wherein the memory includes a plurality of buffers and a buffer prediction logic. The logic is configured to couple to a plurality of network devices, wherein each of the plurality of network devices includes at least one buffer, receive a plurality of buffer service report (BSR) polls from at least one network device at a first polling rate, generate a BSR based at least on the plurality of buffers, transmit the BSR to the plurality of network devices, and receive notification of an updated polling rate.

In some embodiments, the buffer prediction logic is further configured to receive a confidence level associated with the plurality of buffers.

In some embodiments, the BSR further includes BSR data.

In some embodiments the BSR data includes at least one of rate data or retry data.

In some embodiments, a method of predicting buffers in network devices includes coupling to a plurality of network devices over a network, wherein each of the plurality of network devices includes at least one buffer, communicating with the plurality of network devices via a first rate of trigger frames, issuing a plurality of buffer service report (BSR) polls, receiving at least one BSR, utilizing one or more machine learning processes to generate a confidence level associated with the buffer of at least one of the plurality of network devices, determining that the confidence level satisfies a predetermined threshold, and utilizing a second rate of trigger frames during communication with the plurality of network devices.

In some embodiments, the second rate of trigger frames is less than the first rate of trigger frames.

In some embodiments, the selection of the second rate of trigger frames is based on the confidence level.

In some embodiments, the second rate of trigger frames is utilized for a period of time based on the confidence level.

In some embodiments, the method further includes monitoring subsequent confidence levels against the predetermined threshold.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description of the present disclosure will be more fully understood with reference to the following figures, which are presented as exemplary embodiments of the disclosure and should not be construed as a complete recitation of the scope of the disclosure, wherein:

FIG. 3 is a network data flow diagram in accordance with various embodiments of the disclosure;

FIG. 6 is a flowchart of a process for generating a prediction associate with a buffer using machine learning in accordance with various embodiments of the disclosure;

FIG. 7 is a flowchart of a process for generating a BSR based on at least one buffer in accordance with various embodiments of the disclosure.

Figure 1:
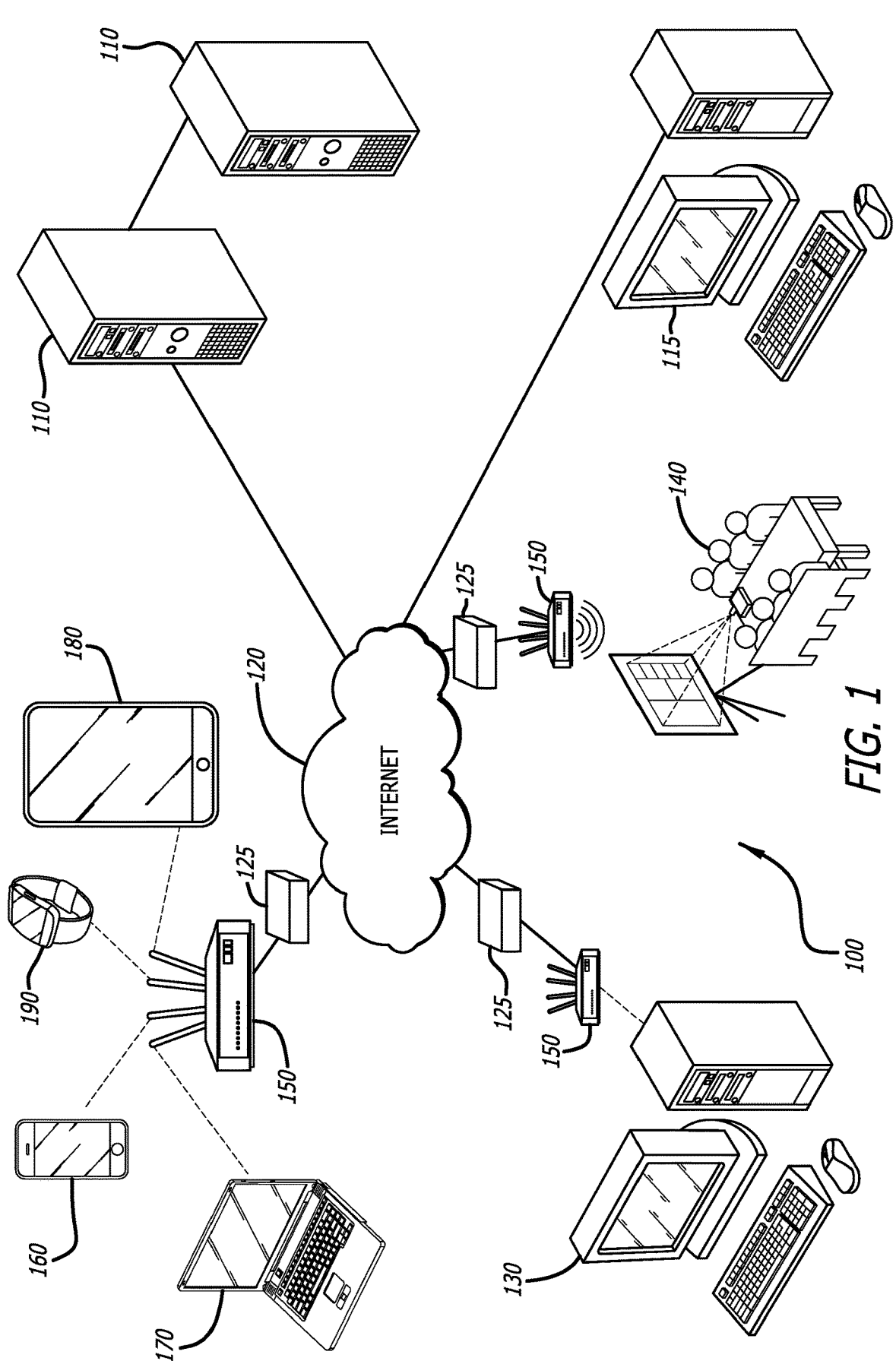
FIG. 1 is a conceptual illustration of a network 100 in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted to facilitate a less obstructed view of these various embodiments of the present disclosure.

DETAILED DESCRIPTION

In response to the problems described above, devices and methods are discussed herein that predict the buffer status of a various devices such as network client devices. When this prediction reaches a target confidence threshold, the Buffer Status Report (BSR) exchange can slow down, leaving more space within the network bandwidth for actual data. A communication structure between network devices can allow for the receiving device to validate the transmitting device prediction (and thus reduce its need for BSRs).

In many embodiments, BSRs are transmitted in response to BSR polls that are received. These BSR polls can be received at various rates from different devices. In certain embodiments, the network devices may simply transmit unsolicited BSRs. Often, as each BSR poll is answered by various client devices, the transmitting device, such as an access point (AP), for example, may be configured to record details contained in the BSR, so as to specify how much total data is in the buffer of the BSR-generating device, along with a breakdown of how much data is allocated to each network device/AP. For example, an AP may use data collected from BSRs over time to analyze patterns and begin to predict future buffer status even before the BSR is collected.

In additional embodiments, one or more machine learning processes may be utilized to make these predictions. In certain embodiments, a Long Short-Term Memory (LSTM) process may be configured within a machine learning process in order to predict these buffer statuses. LSTM methods can have the benefit of processing data inputs to an artificial neural network (ANN) while keeping a short-term memory of prior data-thus providing a system that not only trains the ANN, but also allows short-term recall the recent state of the environment. LSTM has a particular benefit that it can predict the next state based on recent memory and input patterns. In the case of predicting a network device buffer status, after enough data is collected the system will be able to provide predictions about its buffer state just before it is reported through the normal BSR mechanism. Naturally, other machine learning methods and models may be utilized, and LSTM is used as an example.

In still additional embodiments, as the one or more machine learning models are trained, it can begin to test its predictions on a per-device basis. In other words, the machine learning model is tested against new data taken from BSRs to determine how accurate the modelling has become. The device operating the one or more machine learning processes can then compare the BSR returned by a network device, such as a client device, to the predicted BSR. Over time, it is expected that certain input dimensions to the problem will help lead to a highly predictable model. Input dimensions may be the type of device, the traffic type, time of day, device modulation and coding scheme, received signal strength indicators (and their slope/change over an interval), device count in the cell, etc. The AP may use a statistical accuracy prediction method such as Bayesian Inference to determine how accurate its buffer prediction model has become.

Once a satisfactory level of accuracy has been achieved by the buffer prediction model, the transmitting network device may begin altering the Orthogonal Frequency Division Multiple Access (OFDMA) scheme such that the BSR polls sent by the device can be reduced. In some embodiments, this might involve skipping every third BSR poll. In other, more highly predictable scenarios the BSR poll might be skipped every second cycle, etc. The intent here is that, with time and sampling, the algorithm can become more accurate at predicting buffers, thus allowing it to skip the BSR poll trigger step more aggressively. In cases of high predictability, the transmitting device can simply issue the 2nd and 3rd trigger frame, thus skipping the initial BSR poll and BSR response steps.

In embodiments where the buffer prediction has become highly predictable and accurate, the transmitting network device may append information to the second trigger frame informing the receiving network device of its resource unit (RU) assignment for the next set number of cycles. After this occurs, neither the first nor second trigger frame are required until the entire period expires, after which the transmitting device may simply transmit a BSR poll to see how things have changed. Meanwhile, the transmitting device may continue to log how much data is sent by each receiving device and compare it against the accuracy of its predicted model. The transmitting device, such as an AP, may also inform the (compatible) receiving device, such as a client device, about its prediction and its success rate. This information may be used by the receiving device, for example, to skip sending unsolicited BSRs when it concludes that the transmitting device can predict its needs without an explicit BSR.

As a protection mechanism, the transmitting device may be configured to monitor the accuracy of the model prediction. If it finds that prediction accuracy is decreasing (by, for example, monitoring the slope of the prediction accuracy curve) or new sub-flows created (downlink), it can begin reintroducing BSR poll trigger frames and it will simply continue training the model until prediction accuracy again improves to the point where trigger frames may be skipped. In 802.11ax and beyond, for example, an AP may be configured for client device access to the wireless medium using trigger frames. The trigger frames issued by the AP can signal the beginning of a Transmission Opportunity (TXOP) and indicate a preferred access control (associated with multiple traffic types or transaction identifiers). As the TXOP begins, receiving devices, such as client devices, in the user location group can begin transmitting data over the air from their buffer. When the buffer is empty for the target transaction identifiers, the receiving device can continue with traffic from other transaction identifiers if it has some in its buffer. Then, when the buffers are empty, the receiving devices can stop transmitting useful data and continue with padding for the rest of the TXOP duration.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors, logics, or controllers. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, controller, logic, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component or element may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor, controller, and/or logic of a computer or other programmable data processing apparatus to produce a machine, such that the instructions, which execute via the processor, controller, logic, or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Referring to FIG. 1, a conceptual illustration of a network 100 in accordance with various embodiments of the disclosure is shown. Network 100 may comprise a plurality of servers 110 coupled to an administrator console 115 via the Internet 120. The servers may contain various sorts of data that can be accessed from the administrator console 115 and other devices coupled to the Internet 120. In many embodiments, the servers 110 and administrator console 115 may be hard-wired to the Internet 120 using a technology such as Ethernet. The speed of various Ethernet connections may vary depending on the hardware available at each end of the connection. In a number of embodiments, optical or wireless or other types of connections may be used.

Client computer 130 may be coupled with the Internet 120 through Ethernet switch 125. The AP may comprise a network interface controller to communicate with the Ethernet switch. AP 150 may typically comprise one or more device transceivers to support one or more different wireless technologies like, but not limited to, Wi-Fi communicating at 2.4 Gigahertz (GHz), 5.0 GHz, and/or 6.0 GHz, Bluetooth, cellular technologies like 3G, 4G, and 5G, etc., to support wireless network access. Client computer 130 may have an antenna (not shown in the figure) that is coupled with a transceiver. This transceiver may wirelessly couple with antennas and transceivers in wireless AP 150.

Wireless AP 150 may be coupled with an Ethernet cable to Ethernet switch 125. The Ethernet connection speed may be negotiated between AP 150 and Ethernet switch 125. In a variety of embodiments, the speed may be determined by the throughput of the connection with client computer 130 and any other wireless clients coupled to AP 150. Transceivers in AP 150 may be turned completely on or off or put into a state where they may operate with reduced power and reduced bandwidth. Sometimes transceiver/antenna pairs are also referred to as radios. The bandwidth of these radios may be divided into portions called chains, and only some of the chains may be operated at various times in a variety of embodiments. Details of these operations will be discussed below.

Also connected to the Internet 120 is conference room 140 (symbolically represented by people seated around a table). During a meeting in conference room 140, many different clients may be present. Each attendee may have a cellphone, a tablet, a laptop, or other computing device. There may be a projector displaying the desktop of a client in conference room 140 or from some other client from outside conference room 140 (not shown). There may be a VOIP (Voice over Internet Protocol) speaker phone (not shown) carrying a conference call allowing all attendees inside and outside conference room 140 to address the other attendees. All of these connections may be made with a wireless AP 150 coupled with a cable to an Ethernet switch 125 coupled to the Internet 120.

In another location, there may be a plurality of client devices coupled to Internet 120 via another AP 150 and another Ethernet switch 125. Cellphone 160, laptop 170, tablet 180, and smartwatch 290 may all be wirelessly connected to different radios using different protocols in the AP 150. In additional embodiments, the AP 150 and Ethernet switch 125 can be connected with cables to the Internet 120.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc., that can alter buffer prediction optimization. The elements depicted in FIG. 1 may also be interchangeable with other elements of FIGS. 2-8 as required to realize a particularly desired embodiment.

Figure 2:
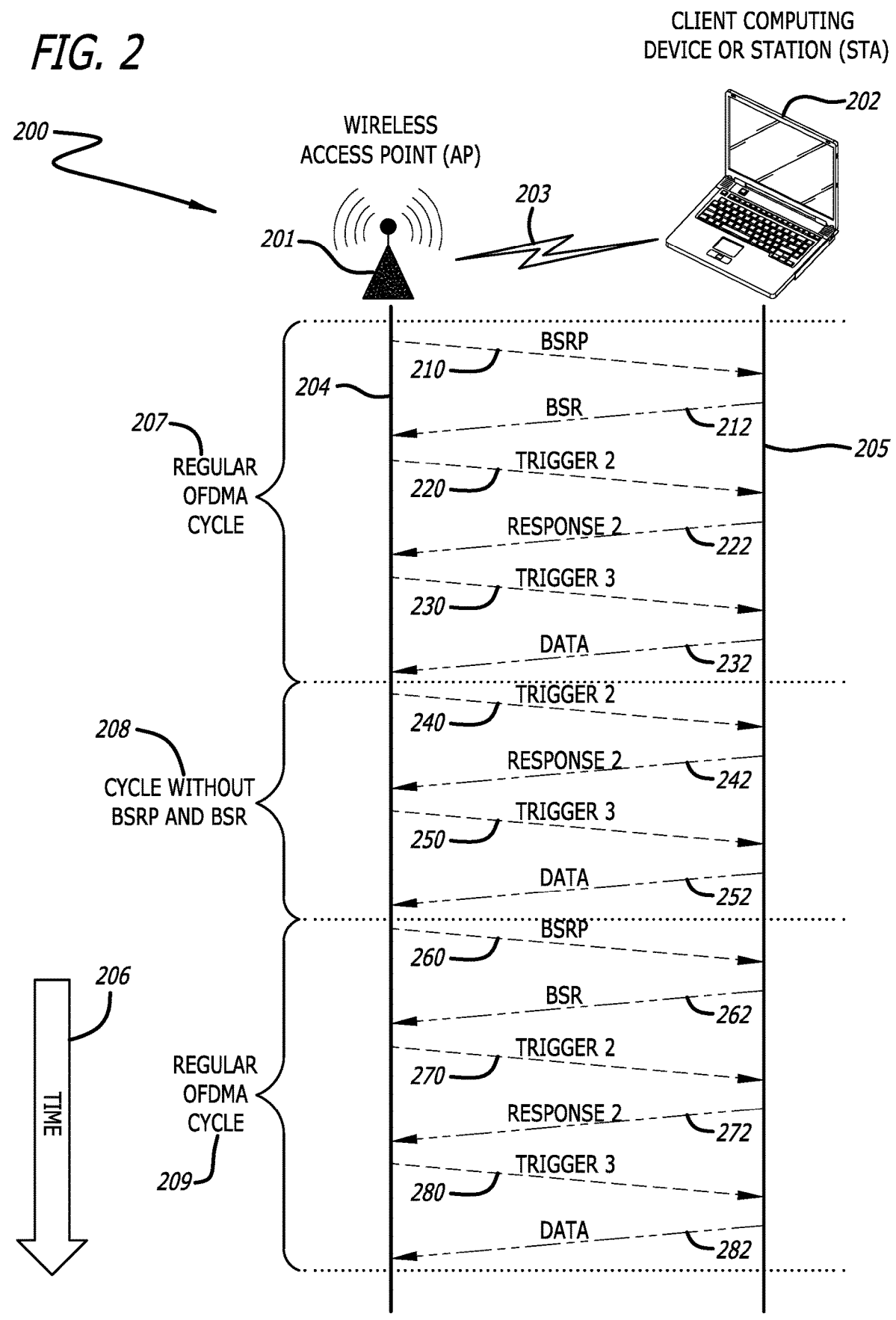
FIG. 2 is a network data flow diagram in accordance with various embodiments of the disclosure.

Referring to FIG. 2, a network data flow diagram in accordance with various embodiments of the disclosure is shown. Although reference is made in this embodiment is made to wireless access points (shown and described as an AP) and client computing devices or stations (shown and described as a STA), these are example devices and it is contemplated that the processes and methods described herein may be carried out by any device, such as a network device. In many embodiments, the network 200 comprises an AP 201, a client computer (STA) 202, and a telecommunications link 203. The telecommunications link 203 may be any wireless technology but in a various embodiments can be IEEE 802.11ax/OFDMA (i.e., Wi-Fi 6). The vertical line 204 may convey when AP 201 transmits or receives a transmission. Similarly, the vertical line 205 may convey when the STA 202 transmits or receives a transmission. Arrow 206 may indicate that time is passing when moving downward along lines 204 and 205. The arrows between the lines 204 and 205 indicate when AP 201 and the STA 202 transmit and/or receive to/from each other.

It should be understood that 802.11ax/be generally operates with an AP polling one or more STAs to determine the queue buffer on their radio interfaces (known as a Buffer Status Report Poll (BSRP) [e.g., a First Trigger Frame]. The STAs may respond to the poll with details regarding how much data is ready to transmit for each AC/TID. This may be understood as a Buffer Status Report (BSR), which is sent back to the AP (the STA can also send this report unsolicited). In certain embodiments, the AP can calculate how to serve each STA by allocating an RU space to each STA, which will be used at the next TXOP. The AP may be configured to inform the STAs of their grouping in a second trigger frame [e.g., a Second or Third Trigger Frame]. However, as those skilled in the art will recognize, certain embodiments may not require this intermediate step in advance of an RU assignment. In some embodiments, the STA may respond with an acknowledgement. Finally, the AP may issue a trigger frame indicating to the STAs of their TXOP and RU assignments and a signal to transmit on these assigned RUs [e.g., a Third Trigger Frame]. In general, the concept of trigger frames implies that there is flexibility in the number of frames that may be employed. However, certain protocols or embodiments may limit the number of trigger frames utilized. Consequently, it should be appreciated that embodiments as described herein may utilize any number of trigger frames.

Wi-Fi 6, for example, may typically operate in various cycles frames as exemplified by a regular OFDMA cycle 207. By way of non-limiting example, the OFDMA cycle 207 may begin with a BSRP signal 210 during which the AP 201 or base station, for example broadcasts synchronization signals to facilitate proper timing alignment among user devices. Following the BSRP, user devices submit one or more BSR signals 212 indicating the amount of data waiting for transmission. The base station processes these reports and determines whether to allocate resources for data transmission. In many embodiments, the BSR signals 212 may be accompanied by one or more triggers, which could be signaling messages indicating specific quality of service requirements or urgency of transmission. For example, each of the frames may include a trigger signal from the AP 201 to the STA 202, and a response signal from the STA 202 is returned to the AP 201. The three trigger signals may be the BSRP signal 210, the TRIGGER 2 signal 220, and the TRIGGER 2 signal 220. The three response signals may be BSR signal 212, RESPONSE 2 signal 222, and DATA signal 232. Persons skilled in the art will realize that the above "signals" may comprise one or more network packets.

In additional embodiments, the AP 201 or base station, for example responds by allocating resources and scheduling transmissions based on the triggers and BSRs received. In response to the scheduling, the user devices send their data using the allocated resources. It should be appreciated that the structured cycle of BSRP, BSR submission, triggers, resource allocation, and data transmission, for example, ensures efficient and coordinated communication in OFDMA-based systems.

In still additional embodiments, AP 201 polls the STAs 202 to determine the queue buffer on their radio interfaces (e.g., a BSRP). This is the first trigger frame. The STAs 202 respond to the poll with details of how much data is ready to transmit. In some embodiments, this may be configured as a BSR, which is sent back to AP 201. AP 201 then calculates how to serve each STA 202 by allocating a resource unit (RU) space to each STA, which will be used at the next transmission opportunity (TXOP). In many embodiments, the AP 201 informs the STAs 202 of their grouping in a second trigger frame triggered by TRIGGER 2 signal 220. The STAs 202 respond with an acknowledgement of this (RESPONSE 2 signal 222). Finally, the AP 201 issues a third trigger frame (TRIGGER 2 signal 220) telling the STAs 202 of their TXOP and RU assignments and a signal to transmit these assigned RUs. The STA 202 then uploads the data in its buffer to the AP 201 (DATA signal 232).

An improvement can be made by reducing the overhead of each cycle. Machine learning can be used to predict the data contained in the BSR (See cycle 208.) In this embodiment, the AP 201 may use the output of a trained ML model instead of initiating a BSRP/BSR handshake. The AP 201 may skip the BSRP and go to TRIGGER 2 signal 240. The STA 202 responds with RESPONSE 2 signal 242. The AP 201 then issues a TRIGGER 2 signal 250, and the STA responds with its DATA signal 252. This effectively eliminates the overhead of the BSRP/BSR handshake during cycle 208. In additional embodiments, any of various devices could be configured to directly receive allocation details and triggers for transmission. These triggers could indicate specific quality of service requirements or urgency of data transmission. In response, devices send their data using the allocated resources. This streamlined cycle my desirably reduce overhead by omitting BSRP and BSR steps, enabling quicker and more responsive data transfers. It also simplifies the communication process while maintaining effective resource management through direct allocation information, making the system more efficient overall.

The AP 201 may then return to a regular OFDMA cycle (209) by transmitting BSRP signal 260, receiving the BSR signal 262 followed by TRIGGER 2 signal 270 and RESPONSE 2 signal 272 and TRIGGER 2 signal 280 and DATA signal 282. As discussed above, the AP 201 can log BSR data over time and may use it to train the ML model to accurately predict future BSR data. It is envisioned that the BSR data provides insights regarding the amount of data waiting for transmission at any given moment. By consistently recording these reports, an AP may accumulate a dataset that captures the historical patterns of data congestion and utilization across different devices. In many embodiments, to leverage this logged BSR data for predictive purposes, an AP can employ one or more ML techniques. The first step may involve data preprocessing, where the collected BSR data is organized into a structured format suitable for training a predictive model. Features such as time of day, day of the week, device identifiers, and previous BSR values can be extracted to enrich the dataset.

In many embodiments, with the preprocessed dataset in hand, an AP can select an appropriate ML algorithm, such as a time-series forecasting model. Given the sequential nature of BSR data, algorithms like recurrent neural networks (RNNs) or Long Short-Term Memory (LSTM) networks can be particularly effective in capturing temporal dependencies and patterns in the data. It should be understood, however, that any other algorithm could be used, without exceeding beyond the spirit and scope of the instant disclosure. In additional embodiments, the dataset may be divided into training and validation sets to train the ML model. During training, the model learns to recognize correlations and trends in the historical BSR data. The AP tunes hyperparameters, adjusts model architecture, and iteratively refines the model's performance using the validation set.

Once trained, the ML model may be configured to accurately predict future BSR values based on historical patterns. This predictive capability is invaluable for an AP to proactively allocate resources and optimize scheduling, thus ensuring optimal data transmission efficiency. The model's predictions can guide resource allocation decisions to avoid potential congestion, manage quality of service, and enhance overall network performance.

It should be appreciated that updates to the model may be necessary to adapt to changing network conditions and usage patterns. For example, as an AP continues to log new BSR data over time, and periodically retrains the model using the updated dataset to maintain predictive accuracy. In additional embodiments, as the model becomes more accurate, the AP 201 may be able to eliminate more BSRP/BSR handshakes saving additional overhead. AP 201 may monitor the accuracy of the ML model over time. If the model becomes more accurate more BSRP/BSR handshakes can be eliminated. If the ML model becomes less accurate over time, then more BSRP/BSR handshakes may be used.

Although a specific embodiment for a network 200 is described above with respect to FIG. 2, any of a variety of systems and/or processes may be utilized in accordance with embodiments of the disclosure. For example, the AP 201 could use multiple ML models and analytics to see which performs better and use that model. The elements depicted in FIG. 2 may also be interchangeable with other elements of FIGS. 1, and 3-8 as required to realize a particularly desired embodiment.

Referring to FIG. 3, a network data flow diagram in accordance with various embodiments of the disclosure is shown. Although reference is made in this embodiment is made to wireless access points (shown and described as an AP) and client computing devices or stations (shown and described as a STA), these are example devices and it is contemplated that the processes and methods described herein may be carried out by any device, such as a network device. A network 300 can comprise an AP 302, a client computing device (STA) 308, and a telecommunications link 306. The telecommunications link 306 may be any wireless technology but in a preferred embodiment IEEE 802.11ax/OFDMA (i.e., Wi-Fi 6) may be used.

The vertical line 304 may convey when AP 302 transmits or receives a transmission. Similarly, the vertical line 305 may convey when the STA 308 transmits or receives a transmission. The arrows between the lines 304 and 305 indicate when AP 302 and the STA 308 transmit and/or receive to/from each other. As shown, in this modified OFDMA communication cycle with #RU transmitted, an enhanced mechanism is introduced by combining a trigger with a resource unit, which is subsequently sent to the STA 308. In many embodiments, the cycle begins with an AP 302 or base station, for example, generating a trigger 320, which encapsulates specific instructions and quality of service requirements for data transmission. In many embodiments, a response 322 is communicated, which results in a trigger/ #RU combination 330, comprising a set of allocated frequency-time resources, and forwarded to the STA 308.

In many embodiments, in response to receiving the trigger/#RU combination 330, the client computing station decodes a trigger to interpret the designated transmission parameters and the urgency level of the data to be sent. The STA 308 utilizes the allocated frequency-time resources from the received resource unit to construct an UpLink Physical Protocol Data Unit (UL-PPDU) 332, for example, containing the data payload for transmission. In additional embodiments, the STA 308 synchronizes its transmission timing with the allocated resources and the base station's schedule. It may be configured to modulate the UL-PPDU 332, 334, 336, and/or 338 according to the prescribed transmission parameters, such as modulation scheme, coding rate, and power level, as specified in the Trigger. Subsequently, the modulated UL-PPDU may be transmitted back to the AP 302, for example. At the AP 302, the received UL-PPDU may be demodulated and decoded. The AP 302 may be configured to extract the data payload and assesses the performance of the transmission based on factors such as signal quality, interference, and error rates. This information is then used to refine future Trigger and Resource Unit assignments, allowing for dynamic adjustments in resource allocation to optimize overall system efficiency and user experience.

In additional embodiments, a modified OFDMA cycle with trigger and combined resource units brings several benefits to the communication system. By bundling instructions and resource allocation information in a single trigger, the process becomes more efficient, reducing overhead and latency. Moreover, the explicit communication of resource allocation in the resource unit ensures accurate utilization of the assigned resources. The cycle's adaptability based on transmission performance feedback fosters an intelligent and responsive communication ecosystem, enhancing overall data throughput, reliability, and quality of service in at least an OFDMA-based network.

In many embodiments, the BSRP 360 initiates a communication cycle by requesting a BSR 362, indicating its readiness to communicate. The BSR is then acknowledged, triggering the network to allocate resources for the device, leading to the Medium Usage-Request to Send (MU-RTS) 370. This step ensures efficient channel access. Upon receiving the MU-RTS, the network responds with the Clear to Send (CTS) frame 372, which in many embodiments confirms the device's permission to transmit. The CTS frame acts as a trigger 380, prompting the device to transmit an UL-PPDU 382 containing its data. This completes the cycle, showcasing a potentially iterative process that enables seamless communication.

Although a specific embodiment for a network is described above with respect to FIG. 3, any of a variety of systems and/or processes may be utilized in accordance with embodiments of the disclosure. For example, the AP could use multiple ML models and analytics to see which performs better and use that model. The elements depicted in FIG. 3 may also be interchangeable with other elements of FIGS. 1-2, and 4-8 as required to realize a particularly desired embodiment.

Figure 4:
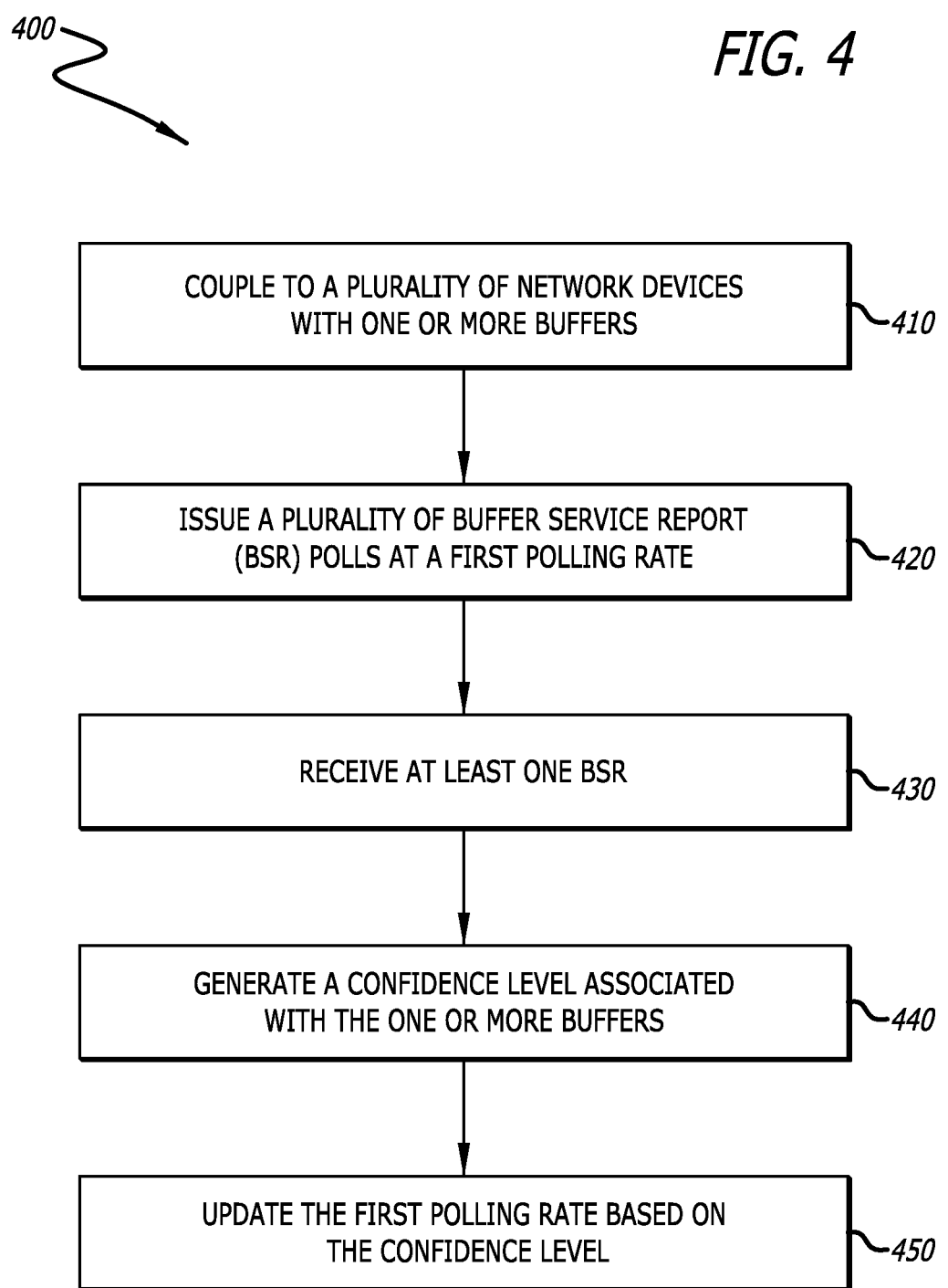
FIG. 4 is a flowchart of a process for generating a confidence level associated with one or more buffers in accordance with various embodiments of the disclosure.

Referring to FIG. 4, a flowchart of a process 400 for generating a confidence level associated with one or more buffers in accordance with an embodiment of the disclosure is shown. In many embodiments, the process generally begins by coupling to one or more buffers of a plurality of network devices (block 410). These buffers may be configured as temporary storage units, capturing, and holding data packets before they are forwarded to their intended destinations. By integrating buffers into the coupling process, the network gains the flexibility to manage data flows more efficiently, handling variations in data rates and delays across different devices. This ensures smoother communication and reduces the risk of data congestion or loss, enhancing the overall network performance and reliability. Through the synergistic coupling of network devices and the incorporation of buffers, ODFMA networks, for example, can achieve optimized data distribution, improved throughput, and reduced latency.

In additional embodiments, a plurality of BSR polls is issued at a first polling rate (block 420). In general, BSR polls serve as control messages that network devices, such as user equipment in cellular networks, send to the base station to indicate the occupancy status of their buffers. It is envisioned that these polls are scheduled and dispatched at a consistent first polling rate, which determines how frequently the devices report their buffer status to the base station. By issuing a series of BSR polls, the network may gain real-time insights into the data traffic conditions and buffer occupancy levels across various devices. In many embodiments, this information enables the network's resource management algorithms to make informed decisions on allocation of communication channels and bandwidth. It should be understood that the first polling rate plays a critical role in striking a balance between obtaining timely buffer status updates and conserving network overhead. Adjusting this rate allows for customization based on network demands, device priorities, and the need to minimize control message overhead.

In still additional embodiments, receiving a BSR involves a network node, such as a base station in a cellular system, capturing and interpreting control messages sent by user devices within the network (block 430). By way of non-limiting example, these messages may contain essential information about the current occupancy levels of the user devices' data buffers. By receiving BSRs, the network gains valuable insights into the congestion status of various devices and their readiness to send or receive data. This enables the network to dynamically allocate resources, adjust communication strategies, and optimize data flow to ensure efficient and reliable transmission, contributing to an overall enhanced network experience.

The process 400 may be configured to generate a confidence level associated with the one or more of the buffers to assess and quantify the reliability of buffer occupancy information within a network context (block 440). This process may include the implementation of one or more sophisticated algorithms and statistical techniques to analyze historical buffer status reports, data arrival patterns, and transmission behaviors, for example. By evaluating these factors, a confidence level may be established or preprogrammed that indicates the degree of certainty regarding the accuracy of reported buffer occupancy. In many embodiments, a higher confidence level may signify a more dependable estimation of buffer status, enabling better-informed decision-making in resource allocation, traffic management, and data prioritization. This confidence level mechanism enhances the network's ability to adapt to varying data dynamics and ensures optimal utilization of resources, ultimately contributing to a more resilient, efficient, and responsive communication ecosystem.

To that end, updating the polling rate based on the confidence level may involve a dynamic adjustment of the frequency at which BSR polls are issued within the network (block 450). This adaptive mechanism may utilize the confidence level, which in some embodiments quantifies the reliability of buffer occupancy information, to fine-tune the rate of BSR requests. When the confidence level is high, indicating a strong assurance in the accuracy of buffer status reports, the polling rate can be increased. This heightened polling frequency enables the network to obtain more frequent updates on buffer conditions, facilitating quicker responsiveness to changing network dynamics. Conversely, in many embodiments, when the confidence level drops, the polling rate can be reduced to mitigate unnecessary overhead caused by unreliable buffer reports. By aligning the polling rate with the confidence level, the network optimizes its resource allocation strategies, enhances traffic management, and ensures efficient data transmission, all of which contribute to a more resilient and adaptable communication environment.

Although a specific embodiment for a process for generating a confidence level associated with one or more buffers is discussed in FIG. 4, any of a variety of systems and/or processes may be utilized in accordance with embodiments of the disclosure. For example, the process 400 may transmit the BSR polls directly to devices but may also, in certain embodiments, broadcast the BSR polls to a plurality of devices that can access the polls. The elements depicted in FIG. 4 may also be interchangeable with other elements of FIGS. 1-3, and 5-8 as required to realize a particularly desired embodiment.

Figure 5:
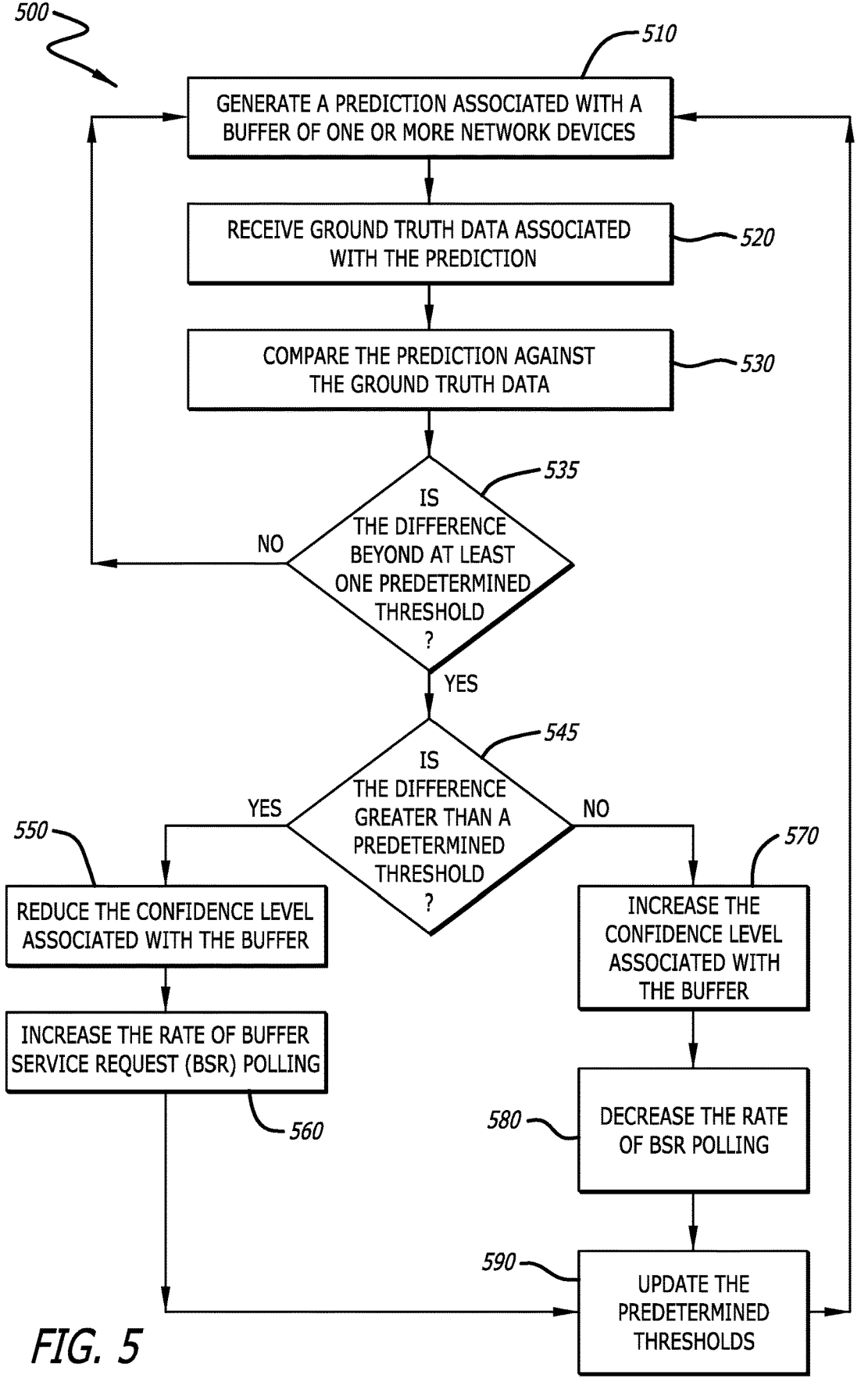
FIG. 5 is a flowchart of a process for adjusting a rate of buffer service request polling in accordance with various embodiments of the disclosure.

Referring to FIG. 5, a flowchart of a process 500 for adjusting a rate of buffer service request polling in accordance with an embodiment of the disclosure is shown. The process begins by generating a prediction associated with a buffer of a network device (block 510). This may involve utilizing historical data and possibly machine learning techniques to anticipate future network traffic or resource utilization within the buffer. By analyzing past patterns and trends, the network device can make an educated guess regarding the likely volume of incoming data or the demand for its resources, allowing for proactive adjustments and optimizations to ensure efficient network operation and prevent potential congestion or performance issues.

In some embodiments, ground truth data associated with the prediction is received (block 520). Receiving ground truth data associated with the prediction entails obtaining the actual, real-world data that corresponds to the anticipated network conditions or resource utilization that were previously predicted. This could involve measuring the actual incoming network traffic, monitoring the actual buffer usage, or observing the real resource demands. By comparing the prediction with the ground truth data, network administrators or algorithms can assess the accuracy of the prediction and make necessary adjustments or improvements to the prediction models, enhancing the overall reliability and effectiveness of the network's predictive capabilities. In additional embodiments, the prediction may be compared against the ground truth data (block 530).

In additional embodiments, the process 500 may include determining if there is a difference beyond at least one predetermined threshold (block 535). In the context of comparing predictions against ground truth data, determining if there is a difference beyond a predetermined threshold may involve assessing whether the predicted values and the actual observed values (ground truth) deviate from each other by a significant amount, surpassing a predefined limit set beforehand. If the variance between prediction and ground truth exceeds this threshold, it may indicate that the prediction might not align well with the actual outcomes, highlighting the need for further investigation or adjustments in the predictive model to ensure its accuracy and reliability in anticipating network behaviors or resource usage. If the result of this determination is "no", then the process returns to generating a prediction associated with the buffer of one or more network devices (block 510).

If the result of the threshold determination is satisfied (shown as "yes"), then a secondary query determines whether the difference is greater than a predetermined threshold (block 545). In some embodiments, this secondary query may determine whether the difference is greater than a predetermined threshold to evaluate the magnitude of the disparity between predicted and actual values in relation to a specific limit that has been pre-established. This assessment may help discern, for example, if the prediction's variance from ground truth data is substantial enough to warrant attention or corrective measures. If the computed difference surpasses the predefined threshold, it signifies a significant level of divergence and prompts the need for further analysis or interventions to rectify any inaccuracies or shortcomings in the prediction process, ultimately ensuring the reliability and effectiveness of the predictive model within the context of network device management.

If the result of this determination is "no", then the confidence level associated with the buffer can be increased (block 570). In some embodiments, the rate of BSR polling may be decreased (block 580). The polling rate decrease can be in proportion to the confidence level associated with the buffer. However, in certain embodiments, the decrease in BSR polling may be a fixed amount (such as dropping a particular number of trigger frame polls, etc.).

In still additional embodiments, the predetermined threshold may be updated (block 590). If the result of the determination at block 545 is "yes", then the confidence level associated with the buffer can be reduced (block 550). In some embodiments, the rate of BSR polling is increased (block 560). Similar to the above, the polling rate increase can be in proportion to the confidence level associated with the buffer. In certain embodiments, in response to the updated confidence level falling below a predetermined threshold, the process 500 can is further configured to increase the BSR polling rate. However, in more embodiments, the increase in BSR polling may be a fixed amount (such as adding a particular number of trigger frame polls, etc.). In still additional embodiments, the predetermined threshold may be updated (block 590). Finally, the process may return iteratively as desired to generate a prediction associated with a buffer of a network device (block 510).

Although a specific embodiment for a process for adjusting a rate of buffer service request polling is discussed in FIG. 5, any of a variety of systems and/or processes may be utilized in accordance with embodiments of the disclosure. For example, thresholds utilized may be static or dynamic in nature. In certain embodiments, the thresholds may be adjusted based on a variety of data such as the amount of processing resources available to generate predictions. The elements depicted in FIG. 5 may also be interchangeable with other elements of FIGS. 1-4, and 6-8 as required to realize a particularly desired embodiment.

Referring to FIG. 6, a flowchart of a process 600 for generating a prediction associated with a buffer using machine learning in accordance with an embodiment of the disclosure is shown. In some embodiments, a BSR associated with at least one buffer of a network device, is received (block 610). This includes metrics such as the buffer's size, current occupancy level, ingress and egress rates of data packets, latency measurements, and any congestion indicators. The BSR acts as a real-time snapshot of the buffer's activity and is crucial for understanding its performance characteristics.

In some embodiments, received BSR data may be recorded into memory, a structured database or storage system, for example (block 620). Recording enables historical tracking and analysis of buffer behavior over time. The recorded data encompasses not only the raw metrics but also contextual information like network topology, device configurations, and any notable events that might have influenced buffer usage patterns.

In additional embodiments, leveraging the accumulated historical BSR data, the process may employ one or more diverse machine learning techniques (block 630). This involves preprocessing the data to handle missing values or outliers and then training models such as autoregressive integrated moving average (ARIMA), long short-term memory (LSTM) networks, or gradient boosting regressors. These models capture temporal dependencies, non-linear relationships, and other intricacies present in the data.

In still additional embodiments, using the trained machine learning models, the process generates predictions for the buffer's behavior (block 640). For instance, predictions might include estimates of the buffer's occupancy levels for the next time interval, projections of data arrival rates, or forecasts of latency under different load scenarios. These predictions are based on patterns identified in the historical data and the models' ability to extrapolate future trends.

To validate the accuracy of the generated predictions, the process may be configured to compare real-world observations—referred to as ground truth data (block 650). This validation entails analyzing how closely the predicted values align with the actual behavior of the buffer during the specified time period. The system may calculate one or metrics, such as mean absolute error, root mean squared error, and correlation coefficients to quantify the degree of prediction accuracy and highlight any discrepancies.

In some embodiments, a determination is made if a prediction has exceeded a predetermined threshold (block 655). In the context of comparing predictions against ground truth data, determining if there is a difference beyond a predetermined threshold may involve assessing whether the predicted values and the actual observed values (ground truth) deviate from each other by a significant amount, surpassing a predefined limit set beforehand. If the variance between prediction and ground truth exceeds this threshold, it may indicate that the prediction might not align well with the actual outcomes, highlighting the need for further investigation or adjustments in the predictive model to ensure its accuracy and reliability in anticipating network behaviors or resource usage. If the result of this determination is "no", then the process returns to receive a BSR associated with at least one buffer of a network device (block 610).

If the result of the determination is "yes", then the rate of BSR polling requests being sent out is reduced (block 660). In some embodiments, for example, the process may be configured to decrease the frequency of requests for BSRs sent to the network device. By doing so, the system conserves bandwidth and processing resources while still maintaining essential insights into buffer behavior, helping to optimize network efficiency.

As an optional step, in some embodiments, resource unit assignments may be incorporated into a trigger frame associated with the network device (block 670). These resource unit assignments can provide additional context for the device's behavior, aiding in accurate prediction generation. This step can enhance the prediction's quality by considering specialized resource allocations for different scenarios.

In additional embodiments, the process may optionally inform the network device regarding the generated predictions and test results (block 680). For example, the process may communicate the generated predictions and their corresponding test results back to the network device. This communication may enable the device to make informed decisions based on the predictions and adapt its operations, accordingly, leading to proactive resource management and potentially mitigating any impending issues. In still additional embodiments, after generating predictions and assessing them against ground truth data, the process continuously monitors the accuracy of subsequent predictions (block 690). By comparing the ongoing predictions with actual outcomes, the system can detect any deviations or inaccuracies and, if necessary, trigger recalibration of the prediction models or adjust the prediction process parameters to maintain reliable forecasting capabilities.

Although a specific embodiment for a process for generating a prediction associated with a buffer using machine learning is discussed in FIG. 6, any of a variety of systems and/or processes may be utilized in accordance with embodiments of the disclosure. For example, thresholds utilized may be static or dynamic in nature. In certain embodiments, the thresholds may be adjusted based on a variety of data such as the amount of processing resources available to generate predictions. The elements depicted in FIG. 6 may also be interchangeable with other elements of FIGS. 1-5, and 7-8 as required to realize a particularly desired embodiment.

Referring to FIG. 7, a flowchart of a process 700 for generating a BSR based on at least one buffer in accordance with an embodiment of the disclosure is shown. In some embodiments, the process 700 begins by coupling to a plurality of network devices (block 710). This may involve establishing connections with multiple network devices. This coupling encompasses configuring physical or logical communication interfaces that enable seamless data exchange between the main system and the network devices. These connections serve as the underlying infrastructure for subsequent data transmission and interactions.

In additional embodiments, an unsolicited buffer service report (BSR) at a first transmission rate may optionally encompass the generation of a buffer service report (BSR) without explicit requests from network devices (block 720). This self-initiated BSR encapsulates vital buffer-related data, such as occupancy and utilization metrics. Following its generation, the main system transmits the BSR to connected network devices using a predetermined transmission rate. This rate ensures that buffer status updates are disseminated effectively across the network.

In some embodiments, a plurality of BSR polls at a first polling rate from one of a plurality of network devices are received (block 730). It is envisioned that the main system receiving BSR poll requests from at least one network device. These requests are sent at a specific polling rate, indicating how often network devices seek buffer status updates. The main system actively awaits these requests and promptly responds, synchronizing its communication with the network devices. In additional embodiments, a BSR based on at least one buffer is generated, which may entail the main system generating a buffer service report (BSR) triggered by BSR poll requests or regular intervals (block 740). It should be understood that such reports may be constructed using buffer-related information such as utilization and occupancy, the BSR offers an overview of the current buffer status within the system. This may empower one or more network devices to make well-informed decisions about their data processing strategies.

In some embodiments, the BSR is transmitted to one of the plurality of network devices (block 750). This may signify the main system's transmission of the generated buffer service report (BSR) to the requesting network device. Through the established communication link, the BSR is relayed to the target network device, ensuring accurate and up-to-date information about buffer statuses. This equips the network device to optimize its data management approaches. In many embodiments, a notification is received of an updated polling rate (block 760). This may involve periodic notifications received by the main system from network devices regarding changes in their polling rates. These notifications serve to communicate adjustments in the frequency at which network devices desire BSR updates. The main system adapts its timing and responsiveness based on these notifications, ensuring that BSRs are delivered in alignment with network device requirements.

In optional embodiments, a confidence level associated with the plurality of buffers is received, which includes the main system receiving confidence level indications related to the buffers (block 770). These confidence levels provide insights into the reliability of buffer status information shared within the BSRs. Expressed numerically or descriptively, these levels aid both the main system and network devices in evaluating the credibility of the provided buffer data. In some embodiments, the transmission rate of unsolicited BSR transmissions may be decreased, which allows the main system to dynamically adjust the transmission rate of unsolicited buffer service reports (BSRs) based on various factors (block 780). These factors may include network congestion, buffer utilization patterns, or specific device requirements. By lowering the transmission rate, the main system conserves network resources while ensuring that critical buffer status updates are conveyed at appropriate intervals.

Although a specific embodiment for a process for generating a BSR based on at least one buffer is discussed in FIG. 7, any of a variety of systems and/or processes may be utilized in accordance with embodiments of the disclosure. For example, the process 700 may generate and transmit/broadcast unsolicited BSRs. Indeed, the BSRs may be associated with a plurality of buffers in certain embodiments, while further embodiments comprise BSRs that are generated individually for each buffer associated with a device. The elements depicted in FIG. 7 may also be interchangeable with other elements of FIGS. 1-6, and 8 as required to realize a particularly desired embodiment.

Figure 8:
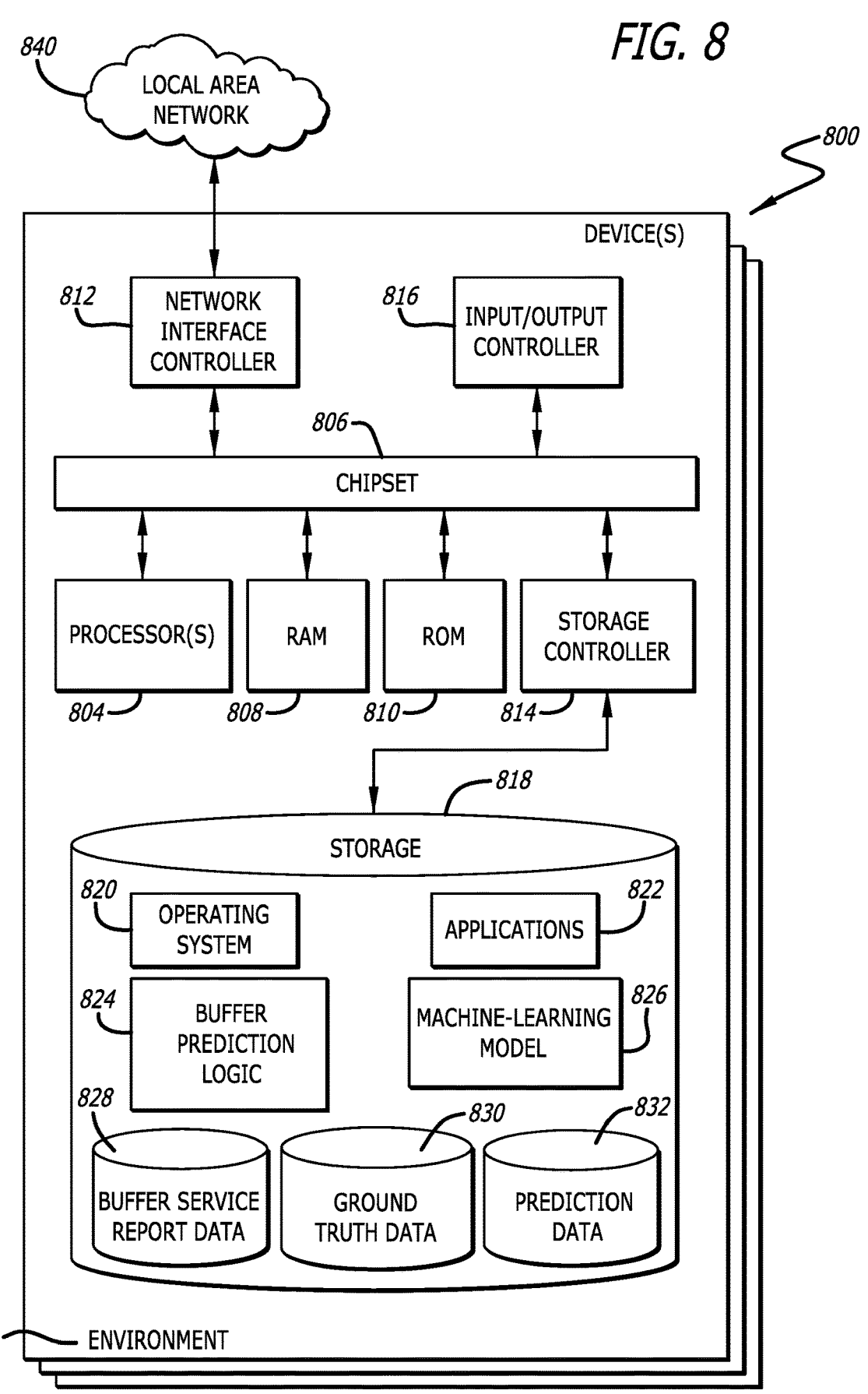
FIG. 8 is a conceptual block diagram of a device suitable for use in tracking electronic devices in accordance with various embodiments of the disclosure.

Referring to FIG. 8, a conceptual block diagram of a device suitable for use in tracking electronic devices in accordance with various embodiments of the disclosure. Referring to FIG. 8, a conceptual block diagram for one or more devices 800 capable of executing components and logic for implementing the functionality and embodiments described above is shown. The embodiment of the conceptual block diagram depicted in FIG. 8 can illustrate a conventional server computer, workstation, desktop computer, laptop, tablet, network appliance, e-reader, smartphone, or other computing device, and can be utilized to execute any of the application and/or logic components presented herein. The device 800 may, in some examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs"), can be configured to operate in conjunction with a chipset 806. The processor(s) 804 can be standard programmable CPUs that perform arithmetic and logical operations necessary for the operation of the device 800.

In additional embodiments, the processor(s) 804 can perform one or more operations by transitioning from one discrete physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Different embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for example, store an operating system 820, applications 822, and data 828, 830, and 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 800 can store data within the storage 818 by transforming the physical state of the physical storage units to reflect the information being stored. The specific transformation of the physical state can depend on various factors. Examples of such factors can include, but are not limited to, the technology used to implement the physical storage units, whether the storage 818 is characterized as primary or secondary storage, and the like.

For example, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In various embodiments, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as applications 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In more embodiments, the device 800 can also include computer-readable storage media having instructions stored thereupon for performing any of the other computer-implemented operations described herein.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8 and can include other components that are not explicitly shown in FIG. 8 or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform the functions described herein. The virtualization layer may generally support a virtual resource that performs at least a portion of the techniques described herein.

In many embodiments, the device 800 can include a buffer prediction logic 824. The buffer prediction logic 824 may involve the examination of reports generated by various network devices regarding their buffer status. This analysis can include assessing the amount of data waiting to be transmitted, prioritizing different types of traffic based on Quality of Service (QoS) requirements, and making decisions about when and how to transmit data from the buffer. By analyzing BSRs, a wireless system can, for example, manage data transmission efficiently, ensuring that time-sensitive and important data gets transmitted promptly while optimizing overall network performance and minimizing delays.

In additional embodiments, the buffer prediction logic 824 can generate and/or otherwise process predictions about the buffers of various network devices. As described in more detail below, one or more machine learning processes can be utilized, such as the machine learning model 826. These machine learning processes can be configured to utilize various data, such as buffer service report data 828, or ground truth data 830, as input, and generate prediction data 832 as an output. This output can be processed by the buffer prediction logic 824 to make one or more decisions related to the methods of data communication including, but not limited to, reducing the number of BSR polls sent, or the number of unsolicited BSRs sent.

This received data can be stored as buffer service report data 828. To that end, buffer service report data 828 may be configured to store information related to the buffer status of one or more network devices. This buffer service report data 828 could include details regarding the amount of data currently queued in the buffer, the type of data (such as voice, video, or regular data), priority levels assigned to different types of data, timestamps indicating when data was added to the buffer, and timestamps of when data was successfully transmitted. Additionally, the buffer service report data 828 might track any instances of data being dropped or delayed due to buffer overflows or other network conditions. In some embodiments, the buffer service report data comprises rate data associated with the rate of transfer, as well as retry data which can be configured to be associated with the number of retries that occurs to transmit data. This data can serve as a valuable resource for network administrators and system algorithms to analyze and optimize the performance of the network by managing buffer usage and ensuring efficient data transmission.

In a number of embodiments, the storage 818 can include ground truth data 830. As discussed above, ground truth data 830 can be configured to include actual measurements or data related to buffers. This ground truth data 830 can be generated in certain devices, and either transmitted and/or broadcast to other network devices. These types of devices can be configured to receive and/or otherwise acquire ground truth data 830 that can be utilized as an input into one or more machine learning processes and can be utilized to generate and/or adjust confidence levels related to buffer predictions. In further embodiments, the ground truth data 830 can be compared against previously generated predictions in order to facilitate updating of the confidence level. This comparison can be carried out by one or more machine learning processes such as the machine learning model 826.

In more embodiments, the storage 818 can further comprise prediction data 832. The prediction data 832 can be the output data of the one or more machine learning processes, such as the machine learning model 826. The prediction data 832 can be utilized to generate or associate one or more confidence levels related to the prediction data 832. In further embodiments, the prediction data 832 may also comprise the confidence level data. In still more embodiments, the prediction data 832 can be generated in one device and transferred to another device for processing. This can allow for the offloading or load-balancing of the available processing resources.

Finally, in many more embodiments, data may be processed into a format usable by a machine learning model 826 (e.g., feature vectors) and/or other pre-processing techniques. The machine learning model 826 may be any type of machine learning model, such as supervised models, reinforcement models, and/or unsupervised models. The machine learning model 826 may include one or more of linear regression models, logistic regression models, decision trees, Naïve Bayes models, neural networks, k-means cluster models, random forest models, and/or other type of machine learning model 826. As discussed above, the machine learning model 826 can be configured to accept various input data, such as buffer service report data 828 or ground truth data 830. The output of the machine learning models 826 can be prediction data 832. The machine learning model 826 can generate predictions related to one or more buffers and/or confidence levels related to one or more buffer predictions.

Although the present disclosure has been described in certain specific aspects, many additional modifications and variations would be apparent to those skilled in the art. Any of the various processes described above can be performed in alternative sequences and/or in parallel (on the same or on different computing devices) to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
at least one network interface controller configured to provide access to a plurality of devices over a network; and
a memory communicatively coupled to the processor, wherein the memory comprises a buffer prediction logic configured to:
   couple to a plurality of network devices, wherein each of the plurality of network devices comprises at least one buffer;
   issuing a plurality of buffer service report (BSR) polls at a first polling rate;
   receiving at least one BSR, wherein the BSR comprises BSR data;
   utilize one or more machine learning processes to generate a confidence level associated with the buffer of at least one of the plurality of network devices;
   update the first polling rate to a second polling rate based on the generated confidence level; and
   receive ground truth data.

2. The device of claim 1, wherein the BSR polls are issued directly to the plurality of network devices.

3. The device of claim 1, wherein the one or more machine learning processes utilize BSR data to generate the confidence level.

4. The device of claim 3, wherein the BSR data is associated with a period of time.

5. The device of claim 1, wherein the one or more machine learning processes generates a prediction of a current buffer status.

6. The device of claim 1, wherein the ground truth data is incorporated into the BSR.

7. The device of claim 1, wherein the one or more machine learning processes are further configured to generate an updated confidence level based on at least a comparison between the ground truth data to a previously generated prediction.

8. The device of claim 7, wherein the updated confidence level is transmitted to at least one of the plurality of network devices.

9. The device of claim 7, wherein the buffer prediction logic is further configured to monitor the updated confidence level over a period of time.

10. The device of claim 9, wherein, in response to the updated confidence level falling below a predetermined threshold, the buffer prediction logic is further configured to increase the BSR polling rate.

* * * * *